United States Patent
Shuchman et al.

(10) Patent No.: US 8,082,186 B2
(45) Date of Patent: Dec. 20, 2011

(54) METHOD AND A SYSTEM FOR GENERATING A CUSTOM ITINERARY ACCORDING TO USER SPECIFICATIONS

(76) Inventors: Moshe Shuchman, Tel Aviv (IL); Imri Goldberg, Rosh Ha'ayin (IL)

( * ) Notice: Subject to any disclaimer, the term of this patent is extended or adjusted under 35 U.S.C. 154(b) by 58 days.

(21) Appl. No.: 12/550,433

(22) Filed: Aug. 31, 2009

(65) Prior Publication Data

US 2011/0055043 A1  Mar. 3, 2011

Related U.S. Application Data

(60) Provisional application No. 61/136,460, filed on Sep. 8, 2008.

(51) Int. Cl.
*G06Q 30/00* (2006.01)
(52) U.S. Cl. .......................... 705/26.5; 705/6
(58) Field of Classification Search ............ 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | | |
|---|---|---|---|---|
| 4,763,277 A | * | 8/1988 | Ashford et al. | 706/47 |
| 4,809,219 A | * | 2/1989 | Ashford et al. | 706/50 |
| 6,622,087 B2 | * | 9/2003 | Anderson | 701/209 |
| 7,610,560 B2 | * | 10/2009 | Horvitz et al. | 715/764 |
| 2002/0082771 A1 | * | 6/2002 | Anderson | 701/209 |
| 2002/0173978 A1 | * | 11/2002 | Boies et al. | 705/1 |
| 2005/0108068 A1 | * | 5/2005 | Marcken et al. | 705/5 |
| 2006/0103674 A1 | * | 5/2006 | Horvitz et al. | 345/629 |
| 2006/0206363 A1 | * | 9/2006 | Gove | 705/6 |
| 2007/0094056 A1 | * | 4/2007 | Kang et al. | 705/5 |
| 2007/0143155 A1 | * | 6/2007 | Whitsett et al. | 705/5 |
| 2008/0221966 A1 | * | 9/2008 | Backsen | 705/9 |
| 2009/0216633 A1 | * | 8/2009 | Whitsett et al. | 705/14 |
| 2011/0050732 A1 | * | 3/2011 | Arrasvuori | 345/666 |

OTHER PUBLICATIONS

Simon Dunstall et al. "An Automated Itinerary Planning System for Holiday Travel", Information Technology & Tourism, 2004, vol. 6 pp. 195-210.*

* cited by examiner

*Primary Examiner* — Naeem Haq
(74) *Attorney, Agent, or Firm* — Law Offices of Edward Langer; Edward Langer, Adv.

(57) ABSTRACT

An automated method for operating a bimodal itinerary creation and management system. The method includes specifying by a user of his travel preferences and telling the system to plan and calculate an itinerary, calculating by the system of an itinerary meeting said user's travel preferences and presenting said itinerary to said user. The method also includes either accepting this as the final itinerary by the user or further specifying and fine tuning his preferences and finally recalculating the itinerary, until a sufficiently satisfactory itinerary is created.

15 Claims, 3 Drawing Sheets

METHOD AND A SYSTEM FOR GENERATING A CUSTOM ITINERARY ACCORDING TO USER SPECIFICATIONS

CROSS-REFERENCE TO RELATED APPLICATION

This application claims priority from U.S. Provisional Application No. 61/136,460, filed on Sep. 8, 2008, entitled A METHOD FOR GENERATING AND MANAGING A CUSTOM ITINERARY ACCORDING TO USER SPECIFICATIONS.

FIELD OF THE INVENTION

The present invention relates generally to itinerary planning, and more particularly to a method and a system enabling one to automate and simplify the task of creating an itinerary.

BACKGROUND OF THE INVENTION

Itinerary planning software is known in the art.

US20070078729A1, Itinerary Planning Tool, System, Method, Software, And Hardware, by Brown, describes an activity-based itinerary planning tool permits a trip planner to incrementally build an itinerary, starting at a selected entry point and adding activities in a step-by-step manner, by taking into account commute times for different types of transportation and entry/exit conditions for particular activities/facilities, in order to present the user with lists of all activities/facilities that can be reached from the entry point or from already-selected activities/facilities. Also, an electronic marketplace for consumers and suppliers of activities is presented to meet and exchange. Consumers are given search tools for narrowing all possible activities to those a consumer can actually perform and attend, based on their proximity and performance criteria. Suppliers are given tools to enter activities into a central repository, and set constraints to prevent unqualified consumers from purchasing. Detection change monitors the activities of the database for changes that will invalidate original recommendations, and provides consumer notification.

US20070150320A1, ITINERARY PLANNING SYSTEM AND METHOD by Huang, describes an itinerary planning system and method applicable to data processing systems is proposed, comprising: a database having travel information and itinerary planning conditions; a setting module for receiving information on itinerary planning conditions set by the user; a searching module for retrieving from the database the travel information that corresponds to itinerary planning conditions set by the user; and a planning module for creating an itinerary based on itinerary planning conditions and the correspondent travel information retrieved from the database, thereby building an itinerary from the database according to itinerary planning conditions set by the user.

JP2001195459A2, SYSTEM AND METHOD FOR ITINERARY PLANNING, by HARAGUCHI, et al, teaches designation by a user of the number of days and the departure place of the travel, and an application displays the fields of a progress schedule for the number of days in a planning palette and defines the departure place designated by the user as the departure place in the 1st day progress schedule. When the user next retrieves desired tour spots with an information palette and selects an arbitrary spot in a list of tour spots retrieved, the detailed information of the selected spot and a peripheral map are displayed in a detailed information palette and a map viewer window respectively. When the user selects one spot from among the list and requests its addition as a destination, the destination is registered in the progress schedule on the corresponding data of the palette, places to be passed through from the departure place up to the destination, traveling means and required times are also registered in the progress schedule. The destination and routes are also displayed on the map of the window.

None of the above provide for itinerary management, caching data and recalculation once a trip has begun.

Thus, it is desirable to create a system which will allow one to automate and simplify the tasks of creating, managing, caching data and adjusting an itinerary, thus saving much time and effort.

SUMMARY OF THE INVENTION

Accordingly, it is a principal object of the present invention to create a system which will enable a user to automate and simplify the tasks of creating, managing, caching data and adjusting an itinerary, thus saving much time and effort.

It is another principal object of the present invention to enable the user to select general traits he would prefer to be associated with the points of interest (POI) in his itinerary.

It is one other principal object of the present invention to enable the user to specify the amount of money the he would like to spend during travel.

It is a further principal object of the present invention to enable the user to specify the budget in exact figures, or in more fuzzy terms.

An automated method is disclosed for operating a bimodal itinerary creation and management system. The method includes specifying by a user of his travel preferences and signaling to the system to plan and calculate an itinerary, calculating by the system of an itinerary satisfying the user's travel preferences and presenting the itinerary to the user. The method also includes either accepting this as the final itinerary by the user or further specifying and fine tuning his preferences and finally recalculating the itinerary, until a sufficiently satisfactory itinerary is created.

DEFINITIONS

1. POI—"Point Of Interest". Any location specifier that may be added to an itinerary, including but not limited to a specific location, a route (such as a street), any zone such as a zone specified by a distance from a point, a zone specified by consecutive lines and arcs (similar to a polygon), any of these with different entry and exit points, any of these with multiple entry or exit points that might be added to the itinerary. A POI may have various properties, such as, but not limited to map coordinates, price, address, name, description, opening hours, waiting time, rating, tags, etc. Some of these may directly affect the way the algorithm will consider the POI; some only affect it indirectly, or not at all.
2. "Must visit" POI—A POI the user specifies that must appear in the itinerary.
3. "Never visit" POI—A POI that the user specifies that must not appear in the itinerary.
4. "Destination"—A general area the user wants to visit, for example, "Israel," "Spain," "Los Angeles," and "Isle of Man."
5. "Itinerary"—A traveling schedule that contains geographical as well as temporal information. It describes where a traveler will be in each point in time. The following is an example excerpt from a simple itinerary of a day in Barcelona:
08:00—schedule start at the hotel
08:00-09:00—Breakfast at the hotel
09:00-09:10—Travel (walking) to the Picasso Museum
09:10-11:30—Picasso Museum
11:30-11:50—Travel (walking) to the Los Caracoles Restaurant
11:50-13:20—Lunch at the Los Caracoles Restaurant
The itinerary may also contain partial or fuzzy information. (For example, "it is still undecided where will I be between 14:00 to 16:00"). Similarly, the itinerary may contain several alternatives to places to be for some of the time. (continuing our example, "between 14:00 and 16:00, I may be at the science museum or at the zoo, I haven't decided yet")
6. "Itinerary segment"—A collection of consecutive days, each relating to a specific destination, or a route between destinations. An example segment is "3 days in Tel Aviv", or "4 Days en route between Paris and Lyon."
7. "Radius Segment"—An Itinerary Segment that is centered around a single destination, for example "5 Days in Los Angeles".
8. "Line Segment"—An Itinerary Segment that is on the way between two destinations, for example, "14 Days en route between Paris and Frankfurt".
9. "Itinerary Frame"—A list of consecutive Itinerary Segments. The following is an example itinerary frame composed of three segments:
Getting to Barcelona (ship)
   I 15 days in Barcelona
   II 3 days on a route between Barcelona and Madrid
   III 1 day in Madrid
Leaving Spain (flight)
Note that the first and third segments are in a specific destination, while the second segment is between destinations. These types of segments are called "radius segments" and "line segments" respectively. Each segment contains schedules for its days, as described above.
10. "Day Template"—Used in two senses. The first informal meaning is straightforward—using a day as a template for other days. The second, more formal meaning is as an itinerary template that for each hour of the day contains constraints on the possible POI's for that hour, as described in the following example:
08:00-12:00—Business meeting
12:00-14:00—Lunch
14:00-16:00—Afternoon nap
16:00-19:00—Visiting attractions
Entries in day templates usually specify activity types (thus POI types), but may also specify a general location, a specific POI, or other constraints.
11. "Itinerary Creation Mode"—The mode of operation while the initial itinerary is created.
12. "Itinerary Management Mode"—The mode of operation once the itinerary begins executing (e.g. the user goes on a trip).
13. "Change of Plans"—During itinerary management mode, the user may decide to change his plans. For example, the weather does not permit going on a trek, an attraction is closed, or a business meeting is canceled. Once this happens, the user first selects a local action, and according to that selection the rest of the itinerary is recalculated.
A change of plans may happen before, during or after the actual change happened. For example, the user may know ahead of time that the museum will be closed. He may get there and discover it is closed. He may get there, discover it is closed, do something else (sit and eat ice-cream, and 4 hours later inform the system that a change happens, and he wants the "change of plans."
14. "Creating an Itinerary"—Creating an itinerary is a common task when planning to travel. An itinerary is a schedule that describes where and when a traveler will be during his travel. Creating an itinerary is usually a laborious task, that requires taking into account a multitude of variables, such as weather, prices, accommodation availability, travel means and so on.
15. "Constraint"—any kind of limitation placed upon the itinerary or a part thereof. Two important constraints are "must see" and "never see" which apply to POI's, but may also apply to other itinerary elements.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is now made to the accompanying drawings, in which like numerals designate corresponding elements or sections throughout, and in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
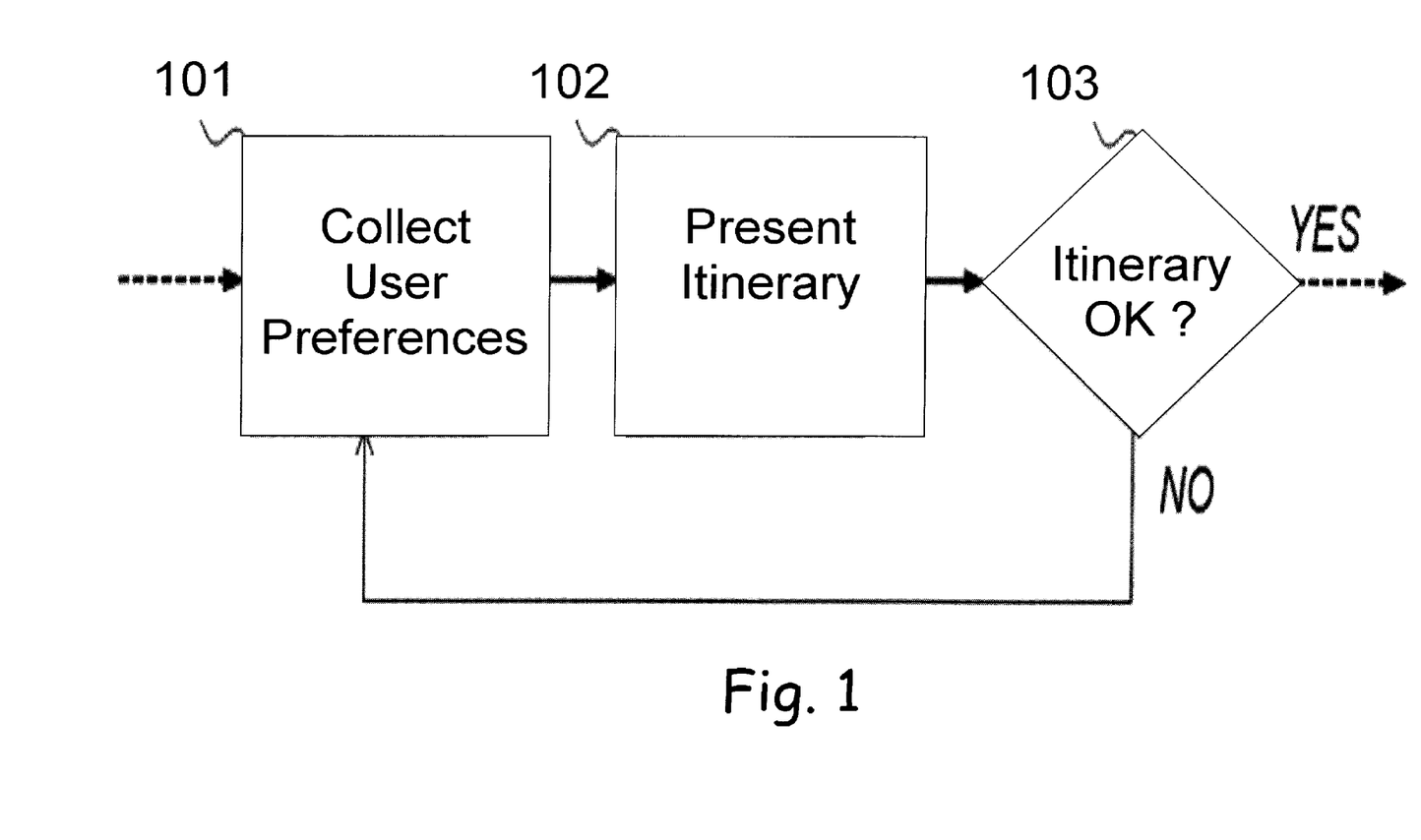
FIG. 1 is a schematic block diagram of an exemplary embodiment illustrating creation of an itinerary, constructed according to the principles of the present invention.

FIG. 1 is a schematic block diagram of an exemplary embodiment illustrating creation of an itinerary, constructed according to the principles of the present invention. User preferences are collected 101, and accordingly an itinerary is constructed. The itinerary is presented to the user 102. Then, if the itinerary is satisfactory 103, operation is complete. Otherwise, more preferences are collected 101 and the cycle is repeated, until the itinerary is satisfactory.

Figure 2:
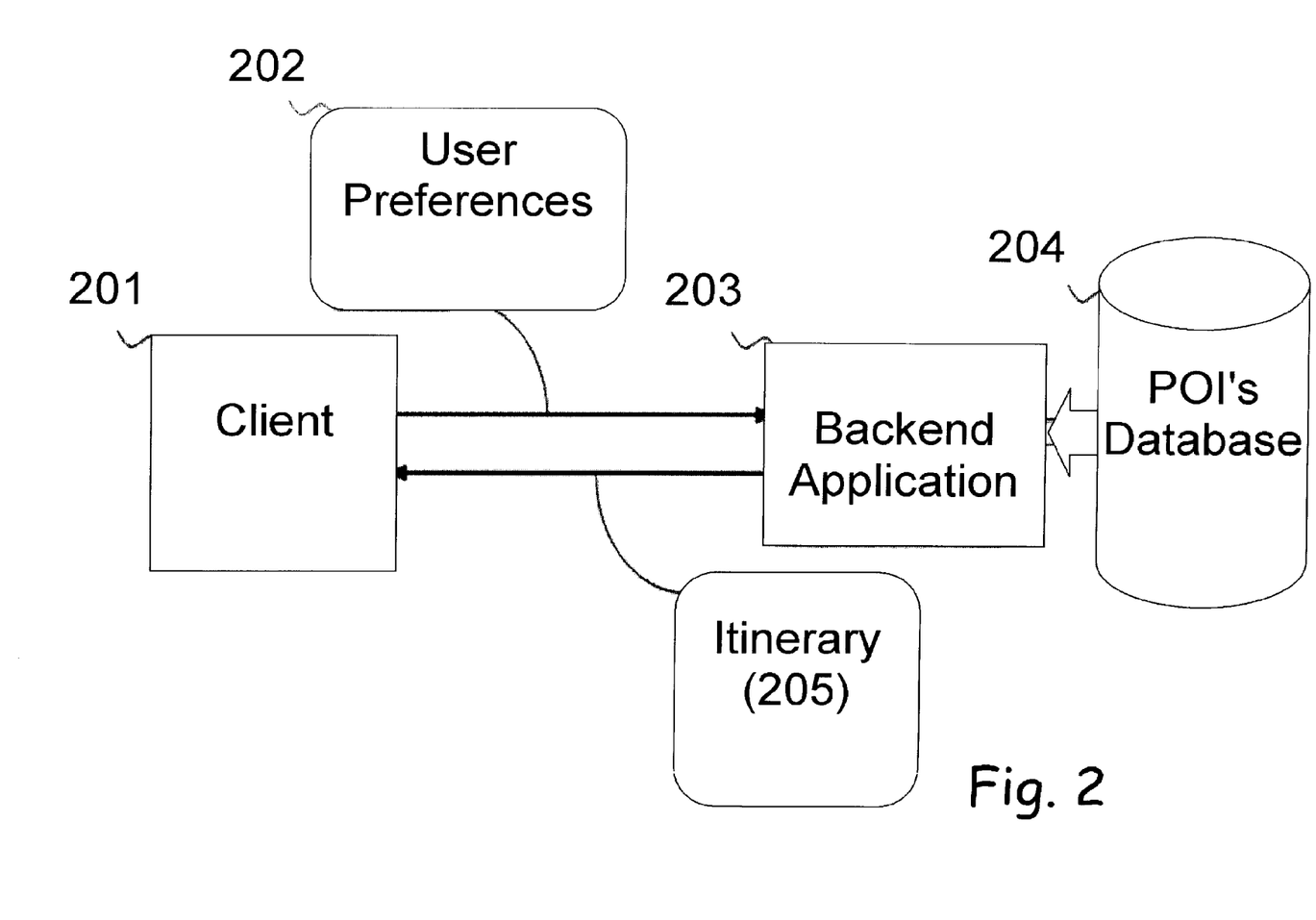
FIG. 2 is a schematic block diagram of a preferred embodiment illustrating creation of an itinerary, constructed according to the principles of the present invention.

FIG. 2 is a schematic block diagram of a preferred embodiment illustrating creation of an itinerary, constructed according to the principles of the present invention. User preferences 202 are collected via the client 201, and are then transferred to the application backend 203. According to these preferences and to the POI's in the POI database 204, an itinerary 205 is constructed, and returned to the client 201.

Figure 3:
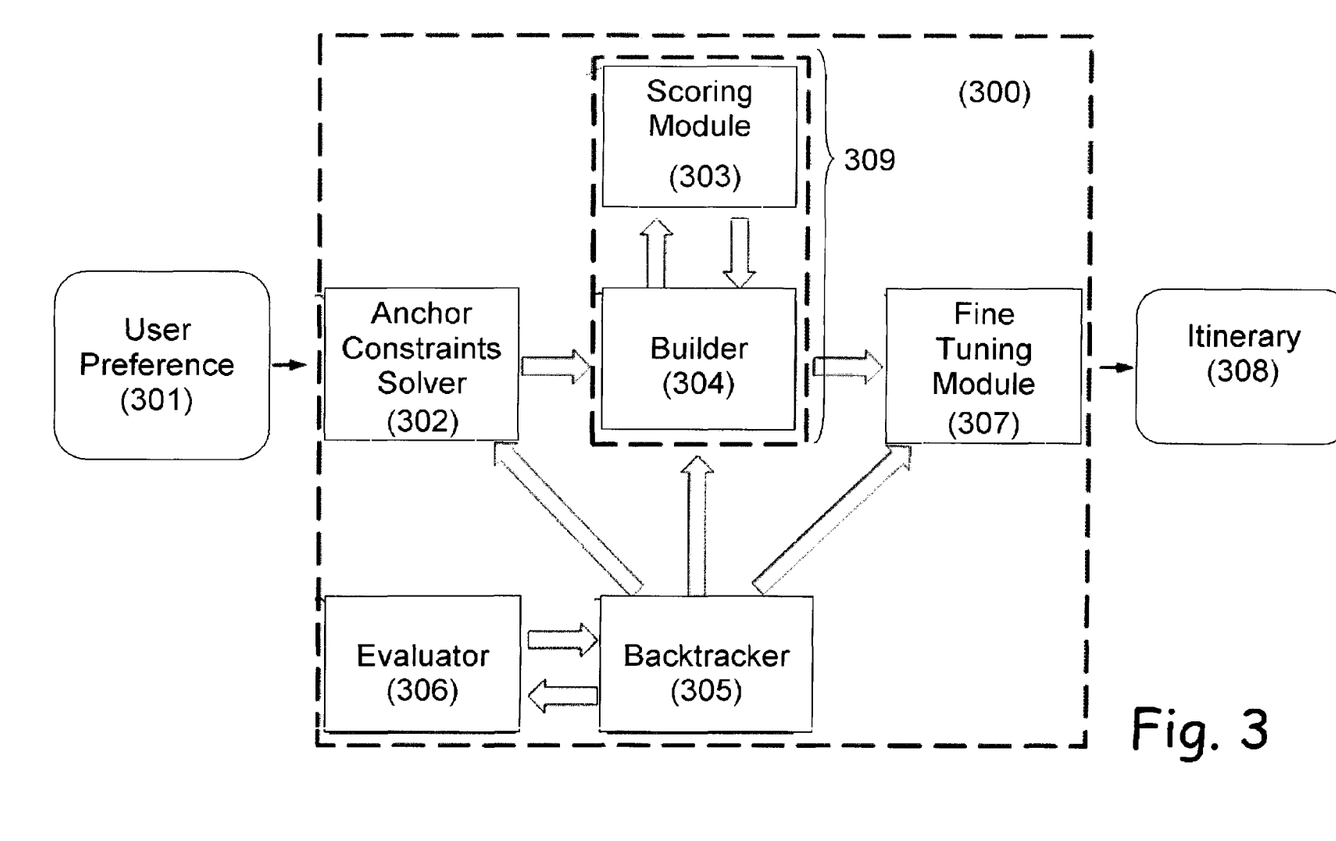
FIG. 3 is a schematic block diagram of a preferred embodiment illustrating the application backend structure, constructed according to the principles of the present invention.

FIG. 3 is a schematic block diagram of a preferred embodiment illustrating the application backend structure 300, constructed according to the principles of the present invention. The system receives the user preferences 301 as input. First, the Anchor Constraints Solver 302 satisfies any global constraints present in the user preferences 301, such as "must see" POI's. Then, the Builder 304 builds an actual POI, while using the Scoring Module 303 as the decision making tool. Finally, the Fine Tuning Module optimizes the itinerary 308, and outputs it. Throughout the process, the Evaluator 306 will score the current itinerary 308, and according to that score, the Backtracker Module 305 may choose to backtrack to any decision made, and change it, so that the resulting itinerary 308 will be optimal.

System Use Method

Itinerary Creation

To use the system, the user specifies his travel preferences, and tells the system to calculate an itinerary. The system calculates an itinerary meeting the user's travel preferences, and presents it to the user, possibly along with itinerary suggestions. The user may then accept this as the final itinerary, or further specify and fine tune his preferences, and recalculate the itinerary, until a sufficiently satisfactory result is achieved.

Itinerary Management

Once traveling has begun, the system switches from Creation Mode to Management Mode. In this mode, the user 'checks off' entries on the itinerary he has visited. In case of a change of plans, the system calculates local suggestions, and recalculates the remaining itinerary to agree with the current plan.

During itinerary management, if the user is using a mobile version of the system, the system may use GPS tracking and other "mobile features" to automatically track the progress of the user through the itinerary.

Top Level Design

The user specifies his preferences using the user interface (UI). These preferences are collected into a single UserPreferences object 301, which is passed to backend 300 of the application. Application backend 300 is comprised of several modules. In "creation mode" (as opposed to "management mode"), these modules operate sequential y, each based the on the result of the previous module. The following is a list of the application backend's 300 modules, listed according to their order of operation:

1. A constraint satisfaction module, which first attempts to satisfy various constraints on the itinerary, for example, "must visit" POI's.

2. An itinerary creation module 309, which is split between builder sub-module 304 and scoring sub-module 303.

3. A fine tuning module 307, which optimizes the created itinerary.

Since each of the previous stages operates in a mostly greedy manner, application back-end 300 may backtrack over any of the previous stages, or over any substage of the previous stages. This allows the system to reach an itinerary with a high global score, even if each POI selected might not be the highest scored POI possible. To achieve this, backtracker module 305 is used. Itinerary evaluator module 306 is used along with backtracker module 305. Evaluator 306 can score a partial or complete itinerary. Other modules, especially backtracker 305, may use global scoring to improve the qualify of the itinerary.

After the itinerary is created, it is presented to the user. At this point, the user may specify additional requirements in his preferences, and repeat the process, until an acceptable itinerary is created.

In Management Mode the system operates similarly, except that when a change of plans happens, the application backend backtracks to the change of plans time, and recalculates the itinerary from this point onwards.

User Preferences Specification 301

The inputs to the itinerary creation system are user preferences 301. Any change the user applies to the itinerary is encapsulated in user preferences 301 and processed by the system. The preferences the user specifies operate on the various levels of the itinerary—from global itinerary options, through per-segment options and per-day options, down to specific changes in the time of arrival at a restaurant, for example.

General Itinerary Options

The user may specify general itinerary options:

1. The length in days of the itinerary.

2. The itinerary frame, comprising of the itinerary segments created by the user. Note that itinerary segments may be for a single destination, or for a route between destinations. For each segment, its length in days is also recorded. Note that this implies the length in days of the complete itinerary.

3. The actual dates for which the itinerary will apply, and the arrival time (for example, 10:00 am). Note that given an itinerary frame, the user only needs to specify the start date and time.

4. Booking preferences. The user may specify whether or not he would like the system to take booking availability into account.

The system is generic, therefore preference types added later will be supported. For example, there may be more constraints than just "must see" and "never see," such as "see at least X times" for different X, "see at most X times," "see only in the morning," "see only at sunset," "see POI X only if POI B is also seen," etc.

Per-Segment Preference Types

Per segment preferences affect the segment as a whole. Some of these preferences may also be considered as itinerary-global options, and not just segment-specific.

1. List of must-visit POI's. These are the POI's the algorithm is forced to include in the itinerary.

2. List of never-visit POI's. These are the POI's the algorithm is forced to exclude from the itinerary.

3. Budget requirements. This specifies the amount of money the user would like to spend during travel. The budget may be specified in exact figures, or in more fuzzy terms (i.e., $$$ signifies "a lot", while $ signifies "a little".) If an exact figure is used, the algorithm will create an itinerary whose budget requirements are guaranteed to be below the given figure. If a fuzzy term is used, the algorithm will create an itinerary whose budget requirements will be within a given percentage of all possible itineraries.

4. Lodging. If applicable, the user may specify his lodging for the duration of the itinerary segment. It should be noted that this option may also be considered as a per-day option.

5. POI type preferences. The user may select general traits he would prefer POI's in his itinerary to have. For example:

user may specify that he would prefer indoor POI's over outdoor POI's;

user may give equal weight to POI's within a destination city relative to POI's within a given distance from the destination city; and user may prefer business related POI's over more cultural POI's.

6. General constraints. The user may specify various general constraints. For example, the user may specify that he is handicapped, vegetarian, traveling with pets, etc.

7. Number of travelers. The user may specify the number of travelers. Also, the user may be able to specify the number of underage travelers.

8. Custom POI. The user may add custom POI's to the list of available POI's. The algorithm will try to fit the given POI in the itinerary along with the rest of the POI's. Note that it is also possible to set a custom POI as a local option.

9. Intensity. The user may specify the intensity of the desired trip, for example on a scale of 1 to 5.

Per-Day Options

Per-day options affect a single day. However, each day's per-day options are based on a "default-day." This way, a user may change the default-day's options, thus again affecting the whole segment. Per-day settings may also be applied to multiple days at once, or used to create 'day templates.'

1. Transportation. The user may specify that for a given day, only a single transportation mode might be used. The user may also specify that one transportation mode is to be preferred, and another should be the 'fallback' mode. For example, given the transportation modes 'private car' and 'public transportation,' the user preferences will be 'only private car,' only 'public transportation,' 'prefer private car' and 'prefer public transportation.' Other possible transportation modes include, but are not limited to 'walking,' 'taxi,' 'rented car,' etc.

2. Dining. The user may specify that he would like to reserve time for dining during the day.

3. Schedule start and end. The user may specify the start and end times of the schedule.

4. Custom activity type. The user may specify a custom activity for the day, such as an afternoon nap, a night-outing, etc. The algorithm will try to match a best fitting POI for the given custom activity type.

Local Options

Local options usually affect a specific point and time in the itinerary. It should be noted that setting a local option may have repercussions over the entire itinerary.

1. A locked POI. The user may specify that a given entry in the itinerary should be locked. The algorithm will not remove it or alter its position in the itinerary.

2. Transportation. Given a specific travel entry in an itinerary, the user may change its travel mode. For example, if the algorithm generates an itinerary with a 20 minute walk between POI a and POI b, the user may choose to change the travel mode to 'Taxi.'

3. Itinerary entry contents. Given a POI that fills a general POI type requirement, the user may choose to alter the listed POI. For example, given that the day template specifies a lunch, the user may choose to alter the actual restaurant selected for the lunch.

4. Custom POI. The user may specify a custom POI that should appear in the itinerary on a specific time, such as a business meeting or a family reunion. Note that it is also possible to set a custom POI as a global option, without the time specification.

Application Backend 300

The application back-end 300 operates as a process that has a defined input and output. The input for application back-end 300 is an object representing user preferences 301. The output is itinerary 308 matching given user preferences 302. Inside application backend 300 user preferences object 301 may be processed during the various stages, and passed around to various layers of the system, as seen in FIG. 3 above. It should be noted that besides user preferences 301, the system also receives as input 'state' information. For example, the system may have access to weather forecasts, booking availability (of restaurants, hotels, etc.), geographical conditions, traffic conditions, etc.

Generally, when making decisions, application backend 300 will score various options for the relevant decisions. The scores will be calculated according to various heuristics. The place where a decision is made is called a decision a point, and will be used later by backtracker 305 to alter decisions made by the system.

Constraint Satisfaction 302

The first stage of the itinerary creation is constraints satisfaction 302. The constraints referred to are global constraints, such as, but not limited to 'must-see' and 'never-see.' For 'never-see' POI's the behavior is straightforward—remove them from the pool of available POI's. For 'must-see' POI's the operation is more involved. 'Must see' POI's are spread around specific days' templates as a forced selection.

When selecting which POI goes where, the algorithm takes into account the current template's constraints, such as activity type, activity location, opening days, etc.

The algorithm may first cluster the 'must-see' elements according to the given days, such that shorter routes will be produced later on.

Two POI's in the same cluster are more likely to be on the same day or on near days.

The result of the constraint satisfaction stage is a list of day templates, altered to conform to the various constraints imposed by the user.

The constraint satisfaction stage is also the first stage where possible user preference conflicts are detected and resolved. If these conflicts prevent the creation of the itinerary, two courses of action are possible: a. finish building an itinerary not fulfilling all constraints according to "best effort" and alert the user to the conflicts, or b. Halt the itinerary creation and alert the user to the conflicts in the preferences.

The constraint satisfaction algorithm will also take into account any budget constraints placed on the itinerary. For example, if all "must see" constraints require more money than the user specified in the allowed budget, it may be reported as a conflict. Another example is trying to keep the budget "burn rate" steady, and place "must see" POI's evenly along the itinerary if required. Also, if there is a choice in budget options for any of the "must see" POI's, the fitting budget option will be chosen according to the place of the "must see" POI in the itinerary, the amount of budget spent on other "must see" POI's, and the amount of budget expected to be spent on other "regular" POI's Itinerary Creation 309

Before itinerary creation 309 may begin, a choice of lodging is preferably made. If the user manually specified his lodging, then that choice is used. Otherwise, the system scores various lodging options according to properties such as price, availability, rating, distance from relevant POI's, etc. Given such scoring, the system makes a lodging selection, and actual itinerary creation 309 may begin.

The direct approach for itinerary creation is going over day templates sequentially, and for each day template, filling entries with fitting POI's. This is best summarized in the following pseudo-code snippet:

For each day_template in day_template_list:
  For each entry in day_template:
    poi_scores=score_POI's(entry, built_itinerary, list_of POI's)
    poi=choose_poi(poi_scores)
    schedule(poi, built_itinerary)

Note that the choice of POI is made according to score, and that the score is dependent on the POI properties, as well as the current state of itinerary and the starting time of the visit to that POI.

To achieve this, two modules are employed—scoring module 303 and builder module 304. Scoring module 303 is concerned with scoring POI's according to the various heuristics. Builder module 304 does the technical work of selecting a POI according to its score, and then scheduling it.

Itineraries may be created for any kind of travel. Examples include, but are not limited to leisure trips, business trips, shopping trips, road trips, etc.

Scoring 303

To score a given POI, various heuristics are used. Each heuristic will increase or decrease the score of a given POI. Some of these heuristics depend on the various properties of the POI, while others depend on the current state of the itinerary. For example, a restaurant might have a high score during noon time, but a lower score in the morning.

The following is a list of heuristics used to score POI's in a preferred embodiment:

1. Rating—attempts to maximize the rating of the given POI, i.e., higher rated POI's will receive a higher score.
2. Travel—attempts to minimize travel time, i.e., a POI which is closer to the previous POI will receive a higher score.
3. Opening hours and days—a. considers only POI's that are open, or for which the ETA is within a reasonable time before opening. b. considers only POI's for which the opening hours allow for a reasonable visit. (For example, a 5 minute lunch is "not reasonable.")
4. Day template—a. forces the builder to consider only POI's matching the constraints imposed by the day-template. For example, for a meal constraint, only restaurants will be scored. b. Increases the score for POI's according to their match levels for non-binary constraints, such as a location constraint. For example, given a day template that requires being at the city center on 20:00, a higher score will be given to POI s which are nearer to the city center. Also, the amount of score actually awarded to POI's will also factor the time gap between the "current time" and the location constraint time. So, continuing the example, when the POI for 19:00 is considered, the distance to the city will have more weight than if the POI for 12:00 is considered.
5. User preferences—attempts to maximize matching between a given POI and a user POI preference. For example, if the user prefers outdoor POI's over indoor POI's, an outdoor POI, such as a park will receive a higher score than an indoor POI, such as a museum.
6. Budget—attempts to prefer POI's that match the budget requirements of the itinerary. This includes two possible heuristics:
    a. A POI will receive a higher score if its budget level matches the global budget level. For example, high class and low class motels will receive lower scores in a mid-range budget itinerary.
    b. A POI will receive a higher score if its budget follows the current spending level. For example, if by the middle of the itinerary, more than half of the budget was spent, lower budget POI's will be preferred, or the other way around.
7. Various other scoring heuristics:
    a. User rating—the user may rate a given POI differently than the system's rating for that POI.
    b. Weather—optimizes the itinerary for weather conditions. For example, on rainy days outdoor POI's will be scored less.

Etc. . . .

Scoring module 303 will gather scores from all given heuristics and combine them to create a uniform score. It will pass the list of possible POI's and their scores to builder module 304.

Builder 304

Builder module 304 does the actual technical work of itinerary creation 309. For each schedule entry, it receives from the list of scoring module 303 POI's and their respective scores. It then selects the highest scored POI to schedule. (See "backtracker" 305 below for the more involved approach).

Given a selected POI, builder 304 will add required travel entries to the resulting itinerary, and 'free time' waits if required. For example, if the given location is the city center, and the selected POI is a museum on the outskirts of the city, builder 304 will add a travel entry to the itinerary, followed by a 'free time' entry if the museum is not yet open by the time 'the user gets there.'

Itinerary Fine Tuning 307

After the previous stage, a complete itinerary is available, possibly filled with blank spots of 'free time.' Fine tuning module 307 will fill this free time if required. It may also decide to change the starting time or duration of POI's using the free time before and after them. For example, given the following itinerary snippet:

08:00-08:10 Travel
    08:10-08:20 Free time
    08:20-09:00 Breakfast
    09:00-09:20 Travel
    09:20-09:30 Free time
    09:30-11:30 Business meeting Fine tuner 307 may decide to move the breakfast earlier, and therewith join available free time segments. Then, fine-tuner 307 might decide to fill it with a short walk around the premises, prep time, or whatever fits the user preferences best.

Fine tuning 307 is also the stage when 'free time' might be filled with content. For example, a 40 minute stretch of free time might be filled with a walk around the city, looking at famous monuments, etc.

Backtracker 305

The itinerary creation process may be described as a series of decisions—each decision being 'where & when to go.' When seen in this light, it is desirable to find the set of decisions that will yield the itinerary best matching user preferences 301. The degree of matching may be determined by itinerary evaluation module 306 (see following section: "Itinerary Evaluation"). Given such a module, backtracker 305 might be implemented that will backtrack along the decision chains, and will cause the responsible module to choose another option. While the new option selected might not be the one with the highest score, it might cause a global increase in itinerary valuation.

For example, consider a situation where the algorithm has to decide what is the first POI to visit on the first day in Paris. Given the results of the various heuristics, it might be that the Eiffel Tower will be the POI with the highest score. However, if instead of visiting it first, the system will first choose to visit a POI on the way between the hotel and the Eiffel tower, the overall route will be shorter, and the itinerary will have a higher total score.

The main decision making points are in constraint satisfaction module 302, the POI selection points are in itinerary building module 309 and fine tuning module 307.

Operation of backtracker 309 may be illustrated as follows:
On a trip to Paris, given that the system chose to first visit the Eiffel tower, the system may then:
a. later decide on a better option;
b. give a relatively low score to that specific tour;
c. consider ahead of time multiple options, one of which is visiting the Eiffel tower.

In each case, various possible "trips" may be computed, or partially computed, and the one with the highest evaluation will be kept as the current working itinerary, while the otters will be discarded. However, it is important to note that various calculation, evaluation, estimation and data fetching steps etc. may be cached to save time, if and when they will be used at a later stage of the itinerary creation process.

Itinerary Evaluation 306

During or after itinerary creation 309, the current version of the itinerary may be evaluated. The itinerary is checked for compliance with user preferences 301 and for general desired values. An itinerary score is generated, which may be used in various modules and phases of the system.

Apart from itinerary score, itinerary evaluation 306 may also assert that some basic conditions and assumptions are satisfied. For example, it may check that there is no time overlap between entries.

Exemplary, non-limiting, evaluation heuristics are as follows:

1. short travel time;
2. optimized time usage—i.e. most time spent in desirable POI's;
3. matching of POI's to user tastes, i.e. itinerary with plenty of cathedrals will be scored higher if the user specified he liked "religious sites;"
4. preferred weather conditions—do the weather conditions match the selected POI's? (nice weather on the day out); and
5. matching to various constraints such as trip intensity, transportation preferences (if walking is preferred, then give low scores to trips with a lot of taxi/public transportation travel entries), etc. . . .

Other Issues

Geographic Data Request Caching and Estimation

While constructing the itinerary and estimating POI's, various geographic data requests have to be made. For example, the estimation of the travel time from a business meeting to the hotel is dependent not only on their geographical coordinates, but also on the roads between the two points, traffic conditions, etc. The actual travel path from two points is rarely a straight line that follows the aerial path. Therefore, a 'driving directions' service will have to be employed. Since theoretically, any POI may follow any other POI in the itinerary, all $n^2-n$ 'driving directions' requests may have to be made. Also, while scoring, various options might be checked more than once (for example, on different days, when the weather conditions have changed).

There are other geographical data request types which might be made, such as 'geocoding'—the conversion of an address to geographical coordinates.

To allow for such requirements, two methods may be used. The first is request caching—each request's results may be cached and fetched directly from the cache to avoid repeated calls for the same input. The second method is request estimation. In various cases, it is possible to estimate the request's result in such a way as to avoid making the request at all. For example, it is wasteful to request direct driving directions from an LA hotel to a New York hotel, when considering a trip between these two points. The request result may first be estimated according to aerial travel time (line-of-sight distance), and only if this time is below a certain limit, request the actual driving directions.

Optimizing Scoring Weights

The method described is very much dependent upon heuristics. By their nature, these heuristics are not exact, and their aggregation depends on fine-tuned weighing. It is clear that a correct setting of the weights for the various heuristics might make the difference between a useful itinerary, and an impossible one.

It is desirable to find a set of weights such that all possible user preferences generate an itinerary with a score above some certain threshold, and such that the average score of all itineraries, weight-based on their likelihood, is maximized.

To achieve this, known optimization methods such as supervised learning and gradient descent may be used to optimize itinerary scoring. Furthermore, the itinerary score for these optimizations might be acquired from various sources, such as itinerary evaluator 309, or user input, thus improving the overall quality of the system.

Itinerary Item Suggestions

While the user specifies his itinerary preferences, it is possible to present him with Item Suggestions. These present possible items to select that are not optimal for his current itinerary preferences, but might still be desirable. For example, for a user who selected a mid-range budget, a 5-star hotel might be suggested, along with the additional cost required. If the user decides to accept the suggestion, he may further choose to compensate for the increase in lodging price by reducing other itinerary components' price, or increase the global budget rating for the itinerary.

Other suggestions may include combinations of POI's that are not optimal by themselves, but present possibilities to reduce total itinerary budget by selecting them together.

Itinerary Splitting

Among other things, the user may specify that he would like to split his itinerary into two in various occasions. One such occasion is a backup or an alternative itinerary, which the user will be able to choose at a later time.

Another situation is when the itinerary is to be used by a group, such as a family. In these cases, it is desirable to allow for kids activities separate from adult activities. For example, one parent might visit an abstract art museum, while the other parent takes the children to the zoo.

Itinerary Synchronizing

When two separate users prepare an itinerary, they may be able to specify that they want their itineraries synchronized for some duration of time. For example, two touring families might wish to tour together for a week, and then go their separate ways.

User Preference Diffing

The process of using the system entails sending the user preferences time after time, and recalculating an itinerary according to them. If the user preferences have changed only a little, a lot of the work done is wasteful and might be cached. To do this, various decision points' situations may be cached. Application back-end 300 will receive only the changed preferences, check which decision points were invalidated, and re-compute the decisions only in these points and other points dependent on those.

In itinerary management mode, the same capabilities are used. In case of a change of plans during itinerary execution, the system will recalculate the itinerary. However, the already traveled part of the itinerary is not recomputed, using the same technique.

Itinerary Creation Calculation Caching

The present invention is optimized to generate an itinerary for a single user as efficiently as possible. However, the system may be further optimized to generate itineraries for a multitude of users efficiently, by caching calculation steps across different users. For example, a trip itinerary to Paris, with the Eiffel tower and the Notre-Dame cathedral may be a common choice. In such cases, any step in the itinerary calculation not dependent upon commonly variable user preferences (such as dates) may be cached between users, to save on calculation time. Specifically, the partial scoring for specific heuristics given to POI's by scoring module 303 may be kept, and not calculated again and again for each user. Other options include caching steps in backtracker 305, itinerary evaluations 306, and the itinerary right after constraint satisfaction 302.

Preference Conflict Detection, Handling And Reporting

During the course of the itinerary computation, the user may specify preferences that contain a conflict, or are impossible to comply with. Examples of these kind of conflicts are, but are not limited to:

Specifying a POI as "must-see," where it is not open during the time frame specified;

Specifying at least two POI's as "must see," where time allowable for them as set by the day template, opening hours, etc. is less than the minimum desired time for a visit in at least one of these POI's; and Setting a POI as fixed at a certain time and another POI as fixed at a later time, where the time between them is not sufficient for travel.

A conflict may be detected at any stage during the itinerary calculation. It is desirable to alert the user to the conflict, and the specific preference specification that caused it. It is also desirable to continue the itinerary calculation, given a "best effort" to overcome the conflict. To achieve that, it may be required to record the order of the specifications made by the user, and record the set of specifications used for the "last conflict-free itinerary." The conflict inducing preference then will be one of those not included in that set. The system will report the preferences not in this set, or alternatively, a subset of only those specifications deemed to be the ones possibly causing the conflict. To overcome the conflict, any specification in the aforementioned set, or subset, may be ignored or relaxed, to allow the itinerary calculation to continue.

Choosing a Destination and Some Preferences According to Other Preferences

Using collected statistics of system use, common itinerary characteristics for various destinations may be derived. Similar characteristics may also be derived given other preferences, such as, but not limited t, budget, intensity, etc.

Given a partial preference specification, the system may, using these collected statistics, derive the set of all itineraries matching the partial specification. This set may then be sorted according to popularity, commonality, or, using itinerary evaluation module 306, a general itinerary score or any other statistics collected by the system. That way, a user may specify a specific destination, and the system will suggest itineraries with ideal budget and date preferences. As described above, other partial specifications are also possible. The user may select a given budget and other itinerary traits, and the system will suggest the best destinations for such trips.

Itinerary Alternatives

Some users prefer to embark on their trips having backup plans. While the system trip management features make backup plans somewhat unnecessary, it is still possible to satisfy this demand. A user might even have a real need for such a feature, if for example, trip management is not available for him during a trip, for lack of Internet connection or a mobile device.

During itinerary creation, using methods similar to those used by the backtracker module 305, more than a single itinerary may be created, with various differing properties. The alternate itineraries may be used to plan for common contingencies, such as closed attractions, delayed flights, etc. Alternate itineraries may also be used to give the user more choice during the day: "do you feel like going to see the Eiffel tower, or the Notre Dame cathedral now?" Also, alternate itineraries may conform to altered preferences, if for example, the user isn't sure about them. For example, two differing itineraries may be prepared for two different intensity levels.

Alternate itineraries need not cover the complete itinerary span. They may be for any span of time, including but not limited to a single visit of an attraction, a part of day, a day, several consecutive days, complete itinerary segments, etc. Other features of the system may also be applied to alternate itineraries. They need not be planned and set ahead, and may also change during trip management. A user may decide to go on a trip with two itineraries running in parallel, and every once in a while choosing which one he'd prefer to go with.

Platform

The system described may be run on, but not limited to: a Web server, a desktop application, as a mobile application, as an internet application for mobile devices, embedded on any device (such as a handheld, or vehicle mounted device).

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. An automated method for operating a bimodal itinerary creation and management computer system having creation and management modes, said method comprising:

specifying by a user during said creation mode, of at least some of his travel preferences and signaling to the system to plan and calculate an itinerary;

scoring a given point-of-interest (POI) along the route of said itinerary, wherein each heuristic will increase or decrease the score of a given POI, and wherein some of these heuristics depend on the various properties of the POI, while others depend on the current state of said itinerary;

calculating by a processor of the system of said itinerary satisfying said user's travel preferences;

presenting said itinerary to said user; and selecting one of:

accepting this as the final itinerary by said user; and at least once, further specifying and fine tuning his preferences, and recalculating the itinerary, until a sufficiently satisfactory itinerary is created, wherein during said management mode, said method further comprises checking off by said user of entries on said itinerary he has visited, and further comprising changing of plans by said user and recalculating by the system of the remaining itinerary to agree with the changed itinerary, and wherein during said management mode, the computer system may be run on one of a Web server, desktop application and mobile device.

2. The method of claim 1, wherein once traveling has begun, switching by the system from itinerary creation mode to management mode and vice versa any number of times.

3. The method of claim 1, further comprising changing of plans by said user and recalculating by the system of the remaining itinerary to agree with the changed itinerary.

4. The method of claim 1 wherein said preferences are similar to preferences commonly used.

5. The method of claim 4, wherein said caching is applied to any calculation made by another user.

6. The method of claim 1, further comprising introducing itinerary suggestions by the system.

7. The method of claim 1, wherein at least two separate users prepare an itinerary, said method further comprising specifying that they want their itineraries synchronized for some duration of time.

8. The method of claim 1, further comprising specifying by said user of the amount of money the he would like to spend during travel.

9. The method of claim 8, wherein said user specifies said amount of money in exact figures.

10. The method of claim 8, wherein said user specifies said amount of money in fuzzy terms.

11. The method of claim 1, wherein the system is run on one of a Web server, desktop application, mobile device, embedded in a handheld and a vehicle mounted device.

12. The method of claim 1, wherein said user preferences include more than one destination.

13. The method of claim 12, wherein said user specified that one or more itinerary segments between any two specified destinations are to be toured as well.

14. The method of claim 1, wherein said user prepares an itinerary for at least two persons, allowing the itinerary to be split and later rejoined, at least once.

15. The method of claim 1, wherein during itinerary management, if said user is using a mobile version of the system, the system may use GPS tracking and other mobile features to automatically track the progress of said user through the itinerary, whereby said computer system can automatically alert and suggest a recalculation of the itinerary in the case of a change of plans.

* * * * *